(12) United States Patent
Chauhan

(10) Patent No.: US 10,817,861 B2
(45) Date of Patent: Oct. 27, 2020

(54) SYSTEM AND METHOD FOR POINT-OF-SALE ELECTRONIC RECEIPT GENERATION AND MANAGEMENT

(71) Applicant: MASTERCARD INTERNATIONAL INCORPORATED, Purchase, NY (US)

(72) Inventor: Rohit Chauhan, Somers, NY (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 211 days.

(21) Appl. No.: 15/831,525

(22) Filed: Dec. 5, 2017

(65) Prior Publication Data

US 2018/0101832 A1 Apr. 12, 2018

Related U.S. Application Data

(62) Division of application No. 14/085,145, filed on Nov. 20, 2013, now Pat. No. 9,846,867.

(51) Int. Cl.
*G06Q 20/20* (2012.01)
*G06Q 20/32* (2012.01)
*G06Q 20/04* (2012.01)

(52) U.S. Cl.
CPC ......... *G06Q 20/202* (2013.01); *G06Q 20/047* (2020.05); *G06Q 20/3224* (2013.01)

(58) Field of Classification Search
USPC .......................................................... 705/21
See application file for complete search history.

(56) References Cited

U.S. PATENT DOCUMENTS

| | | | |
|---|---|---|---|
| 7,139,728 | B2 | 11/2006 | Rigole |
| 7,797,192 | B2 | 9/2010 | Mitchell et al. |
| 8,346,634 | B2 | 1/2013 | Shiftan et al. |
| 8,386,343 | B2 | 2/2013 | Shiftan et al. |
| 8,429,048 | B2 | 4/2013 | Singh |
| 8,534,546 | B2 | 9/2013 | McKelvey |

(Continued)

FOREIGN PATENT DOCUMENTS

| | | |
|---|---|---|
| EP | 1199664 A2 | 4/2002 |
| WO | 0195170 A2 | 12/2001 |
| WO | 2013101244 A1 | 7/2013 |

*Primary Examiner* — Garcia Ade
(74) *Attorney, Agent, or Firm* — Ohlandt, Greeley, Ruggiero & Perle, L.L.P.

(57) ABSTRACT

There is provided a system and a method for the generation and management of point-of-sale (POS) electronic payment transaction receipts. The system and method include a POS component that performs a transaction at a location at which a customer and the POS component are physically present together generates content relating to the transaction; and a payment card that identifies a contact address to which an electronic receipt is to be sent. The POS component generates the electronic receipt based on the content relating to the transaction and causes the electronic receipt to be sent to the contact address identified on the payment card. The electronic receipt management system and method are based on payment transaction receipt information across a plurality of merchants, providing customers with an efficient solution for managing their receipts, and allowing merchants to offer better and more targeted recommendations for customers.

7 Claims, 5 Drawing Sheets

(56) References Cited

U.S. PATENT DOCUMENTS

| | | |
|---|---|---|
| 8,534,551 B2 | 9/2013 | Rothschild |
| 2003/0126020 A1 | 7/2003 | Smith et al. |
| 2004/0181456 A1* | 9/2004 | Matsumori ........ G06Q 30/0207 |
| | | 705/14.1 |
| 2004/0225567 A1 | 11/2004 | Mitchell et al. |
| 2005/0184166 A1 | 8/2005 | Pentz et al. |
| 2007/0094088 A1 | 4/2007 | Mastie et al. |
| 2009/0192817 A1 | 7/2009 | Shiftan et al. |
| 2009/0192925 A1 | 7/2009 | Shiftan et al. |
| 2009/0271322 A1 | 10/2009 | Lay et al. |
| 2009/0313132 A1 | 12/2009 | McKenna et al. |
| 2010/0177343 A1 | 7/2010 | Shapiro et al. |
| 2011/0087596 A1 | 4/2011 | Dorsey |
| 2011/0125598 A1 | 5/2011 | Shin et al. |
| 2011/0307342 A1 | 12/2011 | Haji |
| 2012/0191597 A1 | 7/2012 | Capel et al. |
| 2012/0215650 A1 | 8/2012 | Oba et al. |
| 2012/0261471 A1 | 10/2012 | Wen |
| 2012/0290422 A1 | 11/2012 | Bhinder |
| 2013/0185132 A1 | 7/2013 | Hogg et al. |
| 2013/0198018 A1 | 8/2013 | Baig |
| 2013/0218778 A1 | 8/2013 | Singh |
| 2013/0246203 A1 | 9/2013 | Laracey |
| 2014/0149239 A1* | 5/2014 | Argue ................ G06Q 30/0631 |
| | | 705/21 |

* cited by examiner

SYSTEM AND METHOD FOR POINT-OF-SALE ELECTRONIC RECEIPT GENERATION AND MANAGEMENT

RELATED APPLICATIONS

This application is a divisional of U.S. patent application Ser. No. 14/085,145, entitled SYSTEM AND METHOD FOR POINT-OF-SALE ELECTRONIC RECEIPT GENERATION AND MANAGEMENT and filed on Nov. 20, 2013, which in turn is related to U.S. patent application Ser. No. 14/085,201, entitled SYSTEM AND METHOD FOR POINT-OF-SALE ELECTRONIC RECEIPT STORAGE and filed on Nov. 20, 2013, each of which is incorporated herein by reference in its entirety.

BACKGROUND OF THE DISCLOSURE

1. Field of the Disclosure

The present disclosure relates to a system and a method for the generation of point-of-sale (POS) electronic payment transaction receipts. The present disclosure also relates to a system and a method for the management of POS generated electronic payment transaction receipts.

2. Description of the Related Art

An increasing number of consumers purchase goods and services from a variety of retailers. For example, a consumer may purchase goods and services from a traditional, brick-and-mortar retailer, or over the Internet through an on-line retailer. Additionally, consumers may purchase such goods and services using any number of payment methods. For instance, it is not uncommon for a consumer to pay for one product using cash and another product using a credit card or a gift card.

Typically, at the completion of a purchase transaction, the retailer provides the consumer with a physical record or receipt memorializing the details of the transaction. Generally, receipts are issued by merchants and service providers for a number of reasons including, for example, regulatory or tax reasons and convenience purposes. A receipt provides information about a corresponding transaction for the purpose of providing all participants with a trace or record of the transaction. Receipts may be used for various purposes including, for example, proving participation in a transaction for tax reporting purpose; managing exception situations arising from a transaction, such as, product return; facilitating a subsequent transaction between a service user and a service provider, such as, use as a claim ticket for equipment on repair; or facilitating provision of complementary services, such as, warranties.

Many times, one receipt generated by one retailer is in a different format, e.g., electronic receipts, paper receipts, etc., than a receipt generated by another retailer. Therefore, the average consumer must typically manage a large number of receipts from a variety of retailers for various goods or services purchased using any number of payment methods. Managing such disparate information can be cumbersome and time-consuming for a consumer.

Even with the increased use of electronic receipts, physical receipts are still the most common form when the consumer makes a purchase at a physical POS. One reason for this is that stores typically do not have a consumer's e-mail address or communication device number. Thus, if a consumer would like an electronic receipt, the consumer must provide an e-mail address or a communication device number to the sales associate, which is time-consuming and inconvenient. Moreover, the consumer may not want the merchant to have access to his or her e-mail address or communication device number.

A system and a method for easily providing electronic receipts to a consumer at a POS, and efficiently managing payment transaction receipts, would be very advantageous to a consumer in overcoming the foregoing and other issues.

SUMMARY OF THE DISCLOSURE

There is provided a system and a method for the seamless generation and delivery of POS electronic payment transaction receipts. There is also provided a system and a method for the management of POS generated electronic payment transaction receipts. The system and a method of this disclosure enables efficient management of POS generated payment transaction receipts, thereby providing benefits to users, e.g., customers (e.g., payment card holders) and merchants.

The receipt management system and method of this disclosure are based on POS generated payment transaction receipt information across a plurality of merchants. This cross merchant approach provides customers with an efficient solution for managing all of their POS generated receipts. This cross merchant approach allows merchants to offer better and more targeted recommendations for customers which in turn can boost sales and customer satisfaction. This cross merchant approach provides the most granular consumer's consumption habits. In addition to getting an efficient solution to manage their POS generated receipts, customers can get the added benefit of an enhanced shopping experience from merchants offering better and more targeted recommendations.

There is also provided a system that comprises a POS component that performs a transaction at a location at which a customer and the POS component are physically present together, and that generates content relating to the transaction; and a payment card containing contact information that is stored thereon and that identifies a contact address to which an electronic receipt is to be sent. The POS component generates the electronic receipt based on the content relating to the transaction and causes the electronic receipt to be sent to the contact address identified on the payment card.

There is further provided a method that comprises engaging in a POS transaction with a customer in which said customer is physically present at a location at which the transaction occurs; receiving, from a payment card carried by the customer, contact information that is stored on the payment card and that identifies a contact address to which an electronic receipt is to be sent; generating the electronic receipt based on the transaction; and causing the electronic receipt to be sent to the contact address identified on the payment card.

There is yet further provided a method that comprises receiving, by an electronic receipt server, POS generated payment transaction receipt information over a network with the POS generated payment transaction receipt information corresponding to a product or a service purchased during a purchase transaction; optionally parsing, by an electronic receipt server, the POS generated payment transaction receipt information to retrieve information describing an aspect of the purchased product or service, or the purchase transaction; and storing, by the electronic receipt server, the POS generated payment transaction receipt information and, optionally the information retrieved describing an aspect of the purchased product or service, or the purchase transaction, as an electronic receipt in a database. The database comprises a plurality of electronic receipts, and each of the plurality of electronic receipts is associated with an identifier of a user. The payment transaction receipt information is generated from a POS component that performs the purchase transaction at a location at which a customer and the POS component are physically present together, and that causes the POS generated payment transaction receipt information to be sent to a customer contact address identified on a payment card that is used in the purchase transaction. The POS generated payment transaction receipt information, that is selected by the customer, is sent over a network for storage in the one or more databases.

There is also provided at least one machine readable media comprising a plurality of instructions, which in response to being executed, result in an electronic receipt server; receiving POS generated payment transaction receipt information over a network with the POS generated payment transaction receipt information corresponding to a product or a service purchased during a purchase transaction; optionally parsing the POS generated payment transaction receipt information to retrieve information describing an aspect of the purchased product or service, or the purchase transaction; and storing the POS generated payment transaction receipt information and, optionally the information retrieved describing an aspect of the purchased product or service, or the purchase transaction, as an electronic receipt in one or more databases. The one or more databases comprise a plurality of electronic receipts, and each of the plurality of electronic receipts is associated with an identifier of an entity. The POS generated payment transaction receipt information is generated from a POS component that performs the purchase transaction at a location at which a customer and the POS component are physically present together, and that causes the POS generated payment transaction receipt information to be sent to a customer contact address identified on a payment card that is used in the purchase transaction. The POS generated payment transaction receipt information, that is selected by the customer, is sent over a network for storage in the one or more databases.

There is further provided a method for generating one or more predictive behavioral models. The method comprises retrieving, from one or more databases, POS generated payment transaction receipt information attributable to one or more entities; analyzing the POS generated information to determine purchasing/spending behavioral information of the one or more entities; extracting information related to an intent of the one or more entities from the purchasing/spending behavioral information; and generating one or more predictive behavioral models based on the purchasing/spending behavioral information and intent of the one or more entities. The one or more entities have a propensity to carry out certain activities based on the one or more predictive behavioral models. The POS generated payment transaction receipt information is generated from a POS component that performs the purchase transaction at a location at which a customer and the POS component are physically present together, and that causes the POS generated payment transaction receipt information to be sent to a customer contact address identified on a payment card that is used in the purchase transaction. The POS generated payment transaction receipt information, that is selected by the customer, is sent over a network for storage in the one or more databases.

In accordance with the systems and methods of this disclosure, a merchant never has access to the customer contact address identified on the payment card that is used in the transaction with the merchant. Also, in accordance with the systems and methods of this disclosure, the POS generated payment transaction receipt information can be sent to a customer contact address, or to an electronic receipt depository e-mail address (e.g., an e-receipt eco-system), identified on the payment card that is used in the transaction with a merchant.

Several benefits and advantages are provided by this disclosure. For example, during the check-out process of a purchase transaction, the consumer will be given a choice whether they would like paper receipt, or electronic receipt, or both. If the consumer opts for an electronic receipt, the receipt will be prepared and emailed to the consumer's contact address, or to an electronic receipt depository e-mail address (e.g., an e-receipt eco-system), during the check-out process by the POS component. In accordance with this disclosure, the consumer has the choice as to whether or not any consumer electronic receipts are provided to the electronic receipt depository and thereby made available for querying, and the like.

There is yet further provided a system that comprises an electronic storage device having one or more databases of POS generated payment transaction receipt information stored therein; an access path for allowing access to the POS generated payment transaction receipt information; and a processor for assembling the POS generated payment transaction receipt information in the one or more databases and providing the assembled POS generated payment transaction receipt information to one or more entities that have been granted access to the one or more databases. The POS generated payment transaction receipt information is generated from a POS component that performs a transaction at a location at which a customer and the POS component are physically present together, and that causes the POS generated payment transaction receipt information to be sent to a customer contact address identified on a payment card that is used in the transaction. The POS generated payment transaction receipt information, that is selected by the customer, is sent over a network for storage in the one or more databases of the electronic storage device.

There is also provided a method that comprises providing an electronic storage device having one or more databases of POS generated payment transaction receipt information stored therein; providing an access path for allowing access to the POS generated payment transaction receipt information; assembling, via a processor, the POS generated payment transaction receipt information; and accessing, via the access path, the assembled POS generated payment transaction receipt information by one or more entities that have been granted access to the database. The POS generated payment transaction receipt information is generated from a POS component that performs a transaction at a location at which a customer and the POS component are physically present together and causes the POS generated payment transaction receipt information to be sent to a customer contact address identified on a payment card that is used in the transaction. The POS generated payment transaction receipt information, that is selected by the customer, is sent over a network for storage in the one or more databases of the electronic storage device.

In the electronic receipt depository (e.g., e-receipt eco-system), all consumer receipts can be warehoused in a structured format (itemized). A consumer will have the ability to link all of their transaction accounts to create a consolidated view of all their spending. This e-receipt depository will allow the consumer to query their account on multiple dimensions, for example, receipts for last purchases at Sears; last 5 purchase receipts, last time 'Poland Spring' water was bought, purchases on a specific date, details around the last 3 purchases over $100, and the like. In accordance with this disclosure, the information in the receipt depository will be available to the consumer via their smart phones, computers, and the like, which will be useful, for example, when a consumer returns a purchased item or applies for warranty services.

Other benefits and advantages afforded by the electronic receipt depository embodiment of this disclosure include reports (MIS) that can be made available to consumers with regard to their consumption habits. Such reports can include, for example, statistics at the store or category level, notices for purchases that occur on a regular basis (e.g., dog food every 4 weeks), and the like. Also, recommendations concerning alternative merchants, to save money, can be made to consumers for items that are bought on a regular basis, by comparing the price of the items in stores within a given geographic area.

These and other systems, methods, objects, features, and advantages of the present disclosure will be apparent to those skilled in the art from the following detailed description of the embodiments and the drawings.

BRIEF DESCRIPTION OF THE DRAWINGS

A component or a feature that is common to more than one figure is indicated with the same reference number in each figure.

DETAILED DESCRIPTION OF THE PREFERRED EMBODIMENTS

Figure 1:
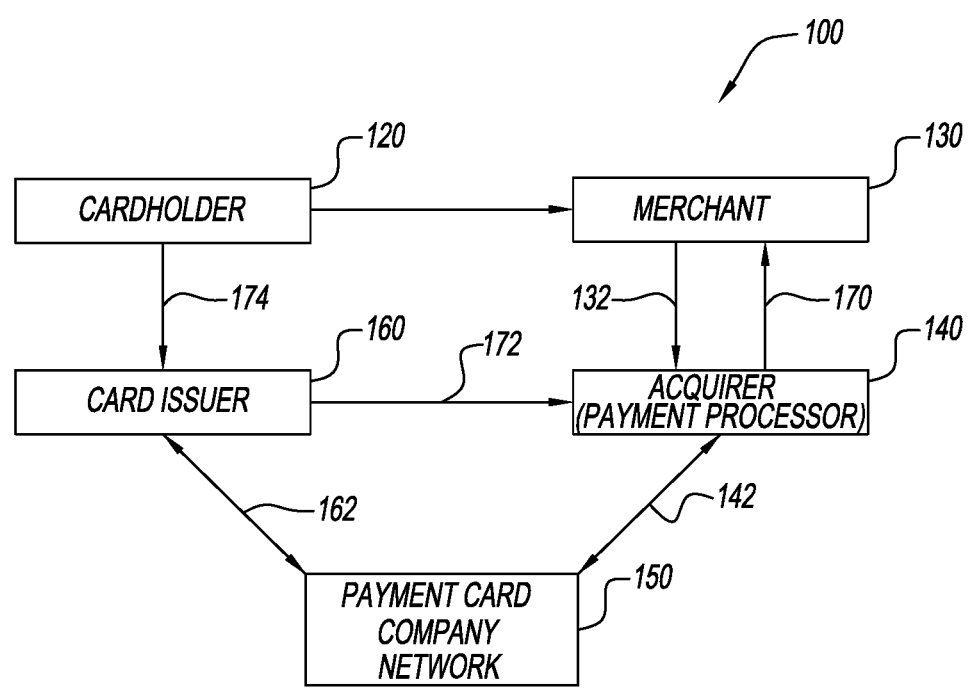
FIG. 1 is a diagram of a four party payment card system.

Embodiments of the present disclosure are described more fully hereinafter with reference to the accompanying drawings, in which some, but not all, embodiments of the present disclosure are shown. Indeed, the present disclosure can be embodied in many different forms and should not be construed as limited to the embodiments set forth herein. Rather, these embodiments are provided so that this disclosure clearly satisfies applicable legal requirements. Like numbers refer to like elements throughout.

Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when stated that something is "based on" something else, it can be based on one or more other things as well. In other words, unless expressly indicated otherwise, as used herein "based on" means "based at least in part on" or "based at least partially on."

As used herein, "entity" or "entities" includes one or more persons, organizations, businesses, institutions and/or other entities such as financial institutions, services providers, and the like that implement one or more portions of one or more of the embodiments described and/or contemplated herein. In particular, entities include a person, business, school, club, fraternity or sorority, an organization having members in a particular trade or profession, sales representative for particular products, charity, not-for-profit organization, labor union, local government, government agency, or political party.

As used herein, "merchant" means a business, company, employer, seller, vendor, supplier, representative of the merchant including, but not limited to, sales persons, agents, clerks, employees, managers, officers, suppliers, contractors, and the like. A merchant can be any person or company engaged in the purchase and/or sale of goods and/or services.

As used herein, "transaction" means any interaction between a business and its customers, vendors, suppliers and others with whom they do business, typically a POS for the purpose of selling and buying products and/or services. The businesses can include, for example, top retailers, entertainment and toy companies, restaurants, family fun, and the like. The products and services can include, for example, family fun, sports, restaurants, events, groceries, apparel, beverages, beauty products, books and magazines, foods, health care, household, furniture, office, personal care, pet care, photography, and the like.

As used herein, "customer" means a buyer, purchaser, or the recipient of a product, service or good from a merchant, seller, vendor or supplier, typically for monetary or other valuable consideration. As used herein, "card holder" means a person or entity that possesses a payment card (e.g., credit card and/or debit card from a payment card company such as MasterCard®, VISA® or American Express®).

As used herein, "electronic receipts" means all receipts (e.g., digital, electronic, and the like) that can be transmitted by electronic means including, but not limited to, e-mailing of the receipts from a POS component. POS generated electronic receipts are generated from a POS component that performs a transaction at a location at which a customer and the POS component are physically present together, and causes the POS generated electronic receipts to be sent to a customer e-mail address identified on a payment card that is used in the transaction. Electronic receipts are accepted at a receipt depository from all entities (e.g., customers, payment card holders, merchants, and the like) in accordance with this disclosure.

The steps and/or actions of a method described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, a hard disk, a removable disk, a CD-ROM, or any other form of storage medium known in the art. An exemplary storage medium can be coupled to the processor, so that the processor can read information from, and write information to, the storage medium. In the alternative, the storage medium can be integral to the processor. Further, in some embodiments, the processor and the storage medium reside in an Application Specific Integrated Circuit (ASIC). In the alternative, the processor and the storage medium can reside as discrete components in a computing device. Additionally, in some embodiments, the events and/or actions of a method can reside as one or any combination or set of codes and/or instructions on a machine-readable medium and/or computer-readable medium, which can be incorporated into a computer program product.

In one or more embodiments, the functions described can be implemented in hardware, software, firmware, or any combination thereof. If implemented in software, the functions can be stored or transmitted as one or more instructions or code on a computer-readable medium. Computer-readable media includes both computer storage media and communication media including any medium that facilitates transfer of a computer program from one place to another. A storage medium can be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures, and that can be accessed by a computer. Also, any connection can be termed a computer-readable medium. For example, if software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. "Disk" and "disc", as used herein, include compact disc (CD), laser disc, optical disc, digital versatile disc (DVD), floppy disk and blu-ray disc where disks usually reproduce data magnetically, while discs usually reproduce data optically with lasers. Combinations of the above should also be included within the scope of computer-readable media.

Computer program code for carrying out operations of embodiments of the present disclosure can be written in an object oriented, scripted or unscripted programming language such as Java, Perl, Smalltalk, C++, or the like. However, the computer program code for carrying out operations of embodiments of the present disclosure can also be written in conventional procedural programming languages, such as the "C" programming language or similar programming languages.

Embodiments of the present disclosure are described herein with reference to flowchart illustrations and/or block diagrams of methods, apparatus (systems), and computer program products. It should be understood that each block of the flowchart illustrations and/or block diagrams, and/or combinations of blocks in the flowchart illustrations and/or block diagrams, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create mechanisms for implementing the functions/acts specified in the flowchart and/or block diagram block or blocks.

These computer program instructions can also be stored in a computer-readable memory that can direct a computer or other programmable data processing apparatus to function in a particular manner so that the instructions stored in the computer readable memory produce an article of manufacture including instruction means that implement the function/act specified in the flowchart and/or block diagram block(s).

The computer program instructions can be loaded onto a computer or other programmable data processing apparatus to cause a series of operational steps to be performed on the computer or other programmable apparatus to produce a computer-implemented process so that the instructions that execute on the computer or other programmable apparatus provide steps for implementing the functions/acts specified in the flowchart and/or block diagram block(s). Alternatively, computer program implemented steps or acts can be combined with operator or human implemented steps or acts in order to carry out an embodiment of this disclosure.

In an embodiment, a system is provided that includes a POS component that performs a transaction at a location at which a customer and the POS component are physically present together, and that generates content relating to the transaction; and a payment card containing contact information that is stored thereon and identifies a contact address to which a receipt is to be sent. The POS component generates the receipt based on the content relating to the transaction and causes the receipt to be sent to the contact address identified on the payment card.

In another embodiment, a method is provided that involves engaging in a POS transaction with a customer in which the customer is physically present at a location at which the transaction occurs; receiving, from a payment card carried by the customer, contact information that is stored on the payment card and that identifies a contact address to which a receipt is to be sent; generating the receipt based on the transaction; and causing the receipt to be sent to the contact address identified on the payment card.

The payment card useful in this disclosure has an information storage medium containing stored encoded data. The information storage medium contains a magnetic stripe or a computer chip. At least part of the stored encoded data comprises the contact information that identifies a contact address to which a receipt is to be sent. Preferably, the contact information includes a contact address of the consumer and/or an e-mail address of a receipt depository.

Referring to the drawings and, in particular, FIG. 1, there is shown a four party payment (credit, debit or other) card system generally represented by reference numeral 100. In card system 100, card holder 120 submits the payment card to the merchant 130. The merchant's POS device communicates 132 with his acquiring bank or acquirer 140, which acts as a payment processor. The acquirer 140 initiates, at 142, the transaction on the payment card company network 150. The payment card company network 150 (that includes the financial transaction processing company) routes, via 162, the transaction to the issuing bank or card issuer 160, which is identified using information in the transaction message. The card issuer 160 approves or denies an authorization request, and then routes, via the payment card company network 150, an authorization response back to the acquirer 140. The acquirer 140 sends approval to the POS device of the merchant 130. Thereafter, seconds later, the card holder completes the purchase and receives a receipt.

The account of the merchant 130 is credited, via 170, by the acquirer 140. The card issuer 160 pays, via 172, the acquirer 140. Eventually, the card holder 120 pays, via 174, the card issuer 160.

Figure 2:
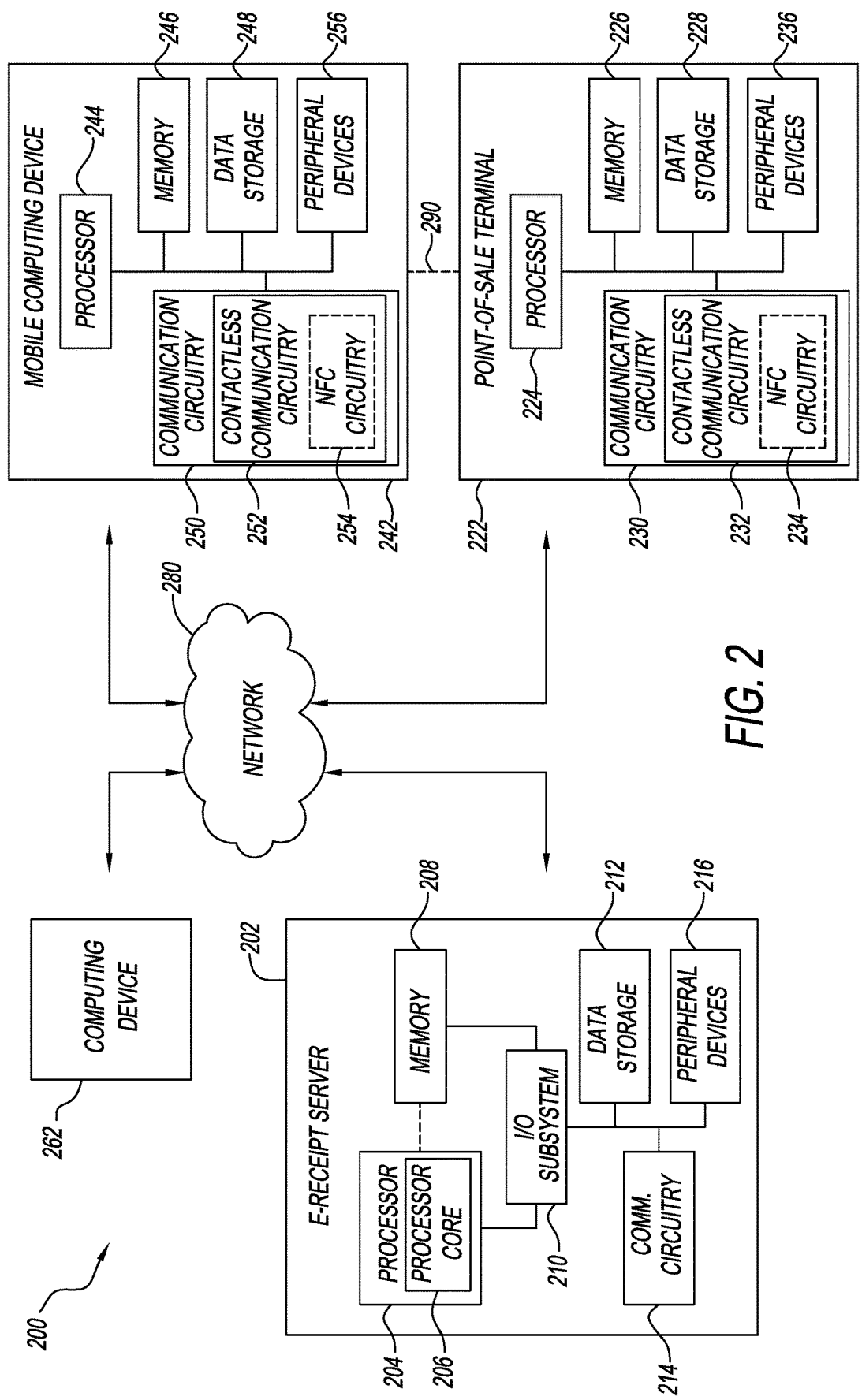
FIG. 2 is a simplified block diagram of at least one embodiment of a system for storing and managing electronic receipts in an exemplary embodiment of the present disclosure.

Referring now to FIG. 2, a system 200 for managing electronic receipts includes an electronic receipt depository or server ("e-receipt server") 202 configured to store and manage one or more electronic receipts corresponding to one or more transactions (i.e., purchasing goods or services, returning goods or cancelling services, refilling prescriptions, and the like), a POS terminal 222 configured to generate and transmit an electronic receipt to the e-receipt server 202, and a mobile computing device 242 configured to remotely manage the one or more electronic receipts on the e-receipt server 202. In some embodiments, the system 200 can also include a computing device 262 configured to remotely manage the one or more electronic receipts stored on the e-receipt server 202. To do so, as discussed in more detail below, the e-receipt server 202 receives an electronic receipt generated by the POS terminal 222 corresponding to a payment transaction. The electronic receipt can be received by the e-receipt server 202 over a network 280 (e.g., the Internet, a private network, a public network, etc.) and stored in a database on the e-receipt server 202. In some embodiments, the e-receipt server 202 can receive the electronic receipt from the mobile computing device 242 acting as a proxy between the POS terminal 222 and the e-receipt server 202.

In an embodiment, the e-receipt server 202 is provided by a payment card company (part of the payment card company network 150 in FIG. 1). Customers can be selective in what receipts they store in the e-receipt server.

In operation, the e-receipt server 202 can store a plurality of electronic receipts, each electronic receipt corresponding to a different transaction and/or a different user. To facilitate organization and storage of the electronic receipts, the e-receipt server 202 stores each electronic receipt (or a portion of the information contained therein) in a database according to an identifier assigned to each user of the system 200. As such, upon receiving a new electronic receipt corresponding to a transaction, the e-receipt server 202 parses the electronic receipt and determines the user identifier associated with the user engaged in the transaction. The e-receipt server 202 can then categorize and store information corresponding to the new electronic receipt in the database as a function of the determined user identifier. Once the e-receipt server 202 has categorized and stored information corresponding to the new electronic receipt in the database, the user can manage the new electronic receipt using the mobile computing device 242 and/or the computing device 262.

It should be understood that although the e-receipt server 202 in the illustrative embodiment of FIG. 2 is configured to manage and store a plurality of electronic receipts corresponding to one or more transactions, the e-receipt server 202 can also be configured to store and manage other types of information. Additionally, in some embodiments, the e-receipt server 202 can be configured, additionally or alternatively, to manage and store other forms of content associated with a particular transaction. For example, in addition to storing and managing an electronic receipt corresponding to a product purchased by the user, the e-receipt server 202 can also store and manage an image of the purchased product or an electronic copy of the user's manual. In such embodiments, the e-receipt server 202 can receive and/or retrieve the other forms of content associated with the particular transaction. Thereafter, the e-receipt server 202 can store and/or link the other forms of content with the electronic receipt stored in the database.

The e-receipt server 202 can be embodied as any type of computing device capable of performing the functions described herein. For example, the e-receipt server 202 can be embodied as a stand-alone server (i.e. rack, tower, mini, and the like), a distributed server, a supercomputer, a mainframe, or any other computing device capable of performing the functions described herein.

In the illustrative embodiment of FIG. 2, the e-receipt server 202 includes a processor 204, an I/O subsystem 210, a memory 208, a data storage device 212, and one or more peripheral devices 216. In some embodiments, several of the foregoing components are incorporated on a motherboard of the e-receipt server 202, while other components can be communicatively coupled to the motherboard via, for example, a peripheral port. Furthermore, it should be appreciated that the e-receipt server 202 can include other components, subcomponents, and devices commonly found a server and/or computing device, which are not illustrated in FIG. 2 for clarity of the description.

The processor 204 of the e-receipt server 202 can be embodied as any type of processor capable of executing software/firmware, such as a microprocessor, digital signal processor, microcontroller, or the like. The processor 204 is illustratively embodied as a single core processor having a processor core 206. However, in other embodiments, the processor 204 can be embodied as a multi-core processor having multiple processor cores 206. Additionally, the e-receipt server 202 can include additional processors 204 having one or more processor cores 206.

The I/O subsystem 210 of the e-receipt server 202 can be embodied as circuitry and/or components to facilitate input/output operations with the processor 204 and/or other components of the e-receipt server 202. In some embodiments, the I/O subsystem 210 can be embodied as a memory controller hub (MCH or "northbridge"), an input/output controller hub (ICH or "southbridge"), and a firmware device. In such embodiments, the firmware device of the I/O subsystem 210 can be embodied as a memory device for storing Basic Input/Output System (BIOS) data and/or instructions and/or other information (e.g., a BIOS driver used during booting of the e-receipt server 202). However, in other embodiments, I/O subsystems having other configurations can be used. For example, in some embodiments, the I/O subsystem 210 can be embodied as a platform controller hub (PCH). In such embodiments, the memory controller hub (MCH) can be incorporated in or otherwise associated with the processor 204, and the processor 204 can communicate directly with the memory 208 (as shown by the hashed line in FIG. 2). Additionally, in other embodiments, the I/O subsystem 210 can form a portion of a system-on-a-chip (SoC) and be incorporated, along with the processor 204 and other components of the e-receipt server 202, on a single integrated circuit chip.

The processor 204 is communicatively coupled to the I/O subsystem 210 via a number of signal paths. These signal paths (and other signal paths illustrated in FIG. 2) can be embodied as any type of signal paths capable of facilitating communication between the components of the e-receipt server 202. For example, the signal paths can be embodied as any number of point-to-point links, wires, cables, light guides, printed circuit board traces, via, bus, link, interconnect, intervening devices, and/or the like.

The memory 208 of the e-receipt server 202 can be embodied as or otherwise include one or more memory devices or data storage locations including, for example, dynamic random access memory devices (DRAM), synchronous dynamic random access memory devices (SDRAM), double-data rate synchronous dynamic random access memory device (DDR SDRAM), mask read-only memory (ROM) devices, erasable programmable ROM (EPROM), electrically erasable programmable ROM (EEPROM) devices, flash memory devices, and/or other volatile and/or non-volatile memory devices. The memory 208 is communicatively coupled to the I/O subsystem 210 via a number of signal paths. Various data and software can be stored in the memory device 208. For example, one or more operating systems, applications, programs, libraries, and drivers that make up the software stack executed by the processor 204 can reside in memory 208 during execution. Furthermore, software and data stored in memory 208 can be swapped between the memory 208 and the data storage device 212 as part of memory management operations. Although only one memory device 208 is illustrated in FIG. 2, the e-receipt server 202 can include any number of additional memory devices in other embodiments.

The data storage device(s) 212 of the e-receipt server 202 can be embodied as any type of device or devices configured for the short-term or long-term storage of data such as, for example, memory devices and circuits, memory cards, hard disk drives, micro hard disk drives, solid-state drives, or other data storage devices. In some embodiments, the data storage device(s) 212 can be used to store information corresponding to one or more electronic receipts generated during a transaction.

Additionally, the e-receipt server 202 can include communication circuitry 214 to facilitate communication with one or more remote computing devices over a network 280. The e-receipt server 202 can use any suitable communication protocol to communicate with other computing devices over the network 280 depending on, for example, the particular type of network(s) 280. For example, in some embodiments, the e-receipt server 202 can communicate with one or more of the POS terminal 222, the mobile computing device 242, and the computing device 262 over the network 280.

The peripheral devices 216 of the e-receipt server 202 can include any number of peripheral or interface devices. For example, the peripheral devices 216 can include a display, a touch screen, a keyboard, a mouse, external speakers, and/or other peripheral devices. The peripheral devices 216 are communicatively coupled to the I/O subsystem 210 via a number of signal paths thereby allowing the I/O subsystem 210 and/or processor 204 to receive inputs from and send outputs to the peripheral devices 216. The particular devices included in the peripheral devices 216 can depend upon, for example, the intended use of the e-receipt server 202.

The POS terminal 222 can be embodied as any type of computing device capable of conducting a sales transaction and performing the other functions described herein. For example, the POS terminal 222 can be a retail or wholesale computer, which may be embodied as a desktop computer, a laptop computer, a tablet computer, a mobile internet device, a handheld computer, a smart phone, a personal digital assistant, a telephony device, or other computing device. In the illustrative embodiment of FIG. 2, the POS terminal 222 includes components similar to the e-receipt server 202 such as a processor 224, a memory 226, a data storage device 228, and one or more peripheral devices 236. In some embodiments, the POS terminal 222 can include an I/O subsystem similar to the I/O subsystem 210 of the e-receipt server 202. In some embodiments, several of the foregoing components can be incorporated on a motherboard of the POS terminal 222, while other components can be communicatively coupled to the motherboard via, for example, a peripheral port. Furthermore, it should be appreciated that the POS terminal 222 can include other components, sub-components, and devices commonly found in a computer and/or computing device, which are not illustrated in FIG. 2 for clarity of the description.

The processor 224 of the POS terminal 222 can be embodied as any type of processor capable of executing software/firmware, such as a microprocessor, digital signal processor, microcontroller, or the like. The processor 224 is illustratively embodied as a single core processor having a processor core. However, in other embodiments, the processor 224 can be embodied as a multi-core processor having multiple processor cores. Additionally, the POS terminal 222 can include additional processors 224 having one or more processor cores.

The processor 224 is communicatively coupled to the components of the POS terminal 222 via a number of signal paths. These signal paths (and other signal paths illustrated in FIG. 2) can be embodied as any type of signal paths capable of facilitating communication between the components of the POS terminal 222. For example, the signal paths can be embodied as any number of wires, cables, light guides, printed circuit board traces, via, bus, link, interconnect, intervening devices, and/or the like.

The memory 226 of the POS terminal 222 can be embodied as or otherwise include one or more memory devices or data storage locations including, for example, dynamic random access memory devices (DRAM), synchronous dynamic random access memory devices (SDRAM), double-data rate synchronous dynamic random access memory device (DDR SDRAM), mask read-only memory (ROM) devices, erasable programmable ROM (EPROM), electrically erasable programmable ROM (EEPROM) devices, flash memory devices, and/or other volatile and/or non-volatile memory devices. The memory 226 is communicatively coupled to other components of the POS terminal 222 via a number of signal paths. Various data and software can be stored in the memory device 226. For example, one or more operating systems, applications, programs, libraries, and drivers that make up the software stack executed by the processor 224 can reside in memory 226 during execution. Furthermore, software and data stored in memory 226 can be swapped between the memory 226 and the data storage device 228 as part of memory management operations. Although only one memory device 226 is illustrated in FIG. 2, the POS terminal 222 can include any number of additional memory devices in other embodiments.

The data storage device(s) 228 of the POS terminal 222 can be embodied as any type of device or devices configured for the short-term or long-term storage of data such as, for example, memory devices and circuits, memory cards, hard disk drives, micro hard disk drives, solid-state drives, or other data storage devices. In some embodiments, the data storage device(s) 228 can be used to store information corresponding to one or more electronic receipts generated during a transaction.

Additionally, POS terminal 222 can include communication circuitry 230 to facilitate communication with one or more remote computing devices over the network 280. The POS terminal 222 can use any suitable communication protocol to communicate with other computing devices over the network 280 depending on, for example, the particular type of network(s) 280. For example, in some embodiments, the POS terminal 222 can communicate with one or more of the e-receipt server 202, the mobile computing device 242, and the computing device 262 over the network 280.

In some embodiments, the communication circuitry 230 of the POS terminal 222 includes a contactless communication mechanism 232. In such embodiments, the POS terminal 222 can use the contactless communication mechanism 232, such as the near-field communication (NFC) circuitry 234, to transmit and/or receive data to/from one or more remote computing devices without using the network 280. For example, the POS terminal 222 can use NFC data exchanges 290 to transfer data to/from the mobile computing device 242, which as discussed below, can also include NFC circuitry. It should be understood that although the contactless communication circuitry 232 of the POS terminal 222 is embodied as the NFC circuitry 234 in the illustrative embodiment, the contactless communication circuitry 232 can be embodied as, or otherwise include, other types of contactless communication mechanisms for transferring data to/from the mobile computing device 242 in other embodiments. For example, the contactless communication circuitry 232 of the POS terminal 222 can be embodied as Bluetooth® circuitry or any other short-range communication circuitry suitable for use in communicating with the mobile computing device 242.

The peripheral devices 236 of the POS terminal 222 can include any number of peripheral or interface devices. For example, the peripheral devices 236 can include a display, a touch screen, a keyboard, a mouse, external speakers, and/or other peripheral devices. The peripheral devices 236 are communicatively coupled to the I/O subsystem via a number of signal paths thereby allowing the I/O subsystem and/or processor 224 to receive inputs from and send outputs to the peripheral devices 236. The particular devices included in the peripheral devices 236 can depend upon, for example, the intended use of the POS terminal 222.

The mobile computing device 242 can be embodied as any type of portable device capable of performing the management and/or proxy functions described below. Similar to the e-receipt server 202 and the POS terminal 222, the mobile computing device 242 can include various components typically found in a computing device. In the exemplary embodiment of FIG. 2, the mobile computing device 242 includes a processor 244, a memory 246, a data storage device 248, communication circuitry 250, and one or more peripheral devices 256. As such, the mobile computing device 242 can include components similar to those described above in relation to the e-receipt server 202 and/or the POS terminal 222.

In some embodiments, the communication circuitry 250 of the mobile computing device 242 includes a contactless communication mechanism 252. In such embodiments, the mobile computing device 242 can use the contactless communication mechanism 252, such as the near-field communication (NFC) circuitry 254, to transmit and/or receive data to/from one or more remote computing devices without using the network 280. For example, the mobile computing device 242 can use NFC data exchanges 290 to transfer data to/from the POS terminal 222, which as discussed above, may also include NFC circuitry. It should be understood that although the contactless communication circuitry 252 of the mobile computing device 242 is embodied as the NFC circuitry 254 in the illustrative embodiment, the contactless communication circuitry 252 can be embodied as, or otherwise include, other types of contactless communication mechanisms for transferring data to/from the POS terminal 222 in other embodiments. For example, the contactless communication circuitry 252 of the mobile computing device 242 can be embodied as Bluetooth® circuitry or any other short-range communication circuitry suitable for use in communicating with the POS terminal 222.

Figure 3:
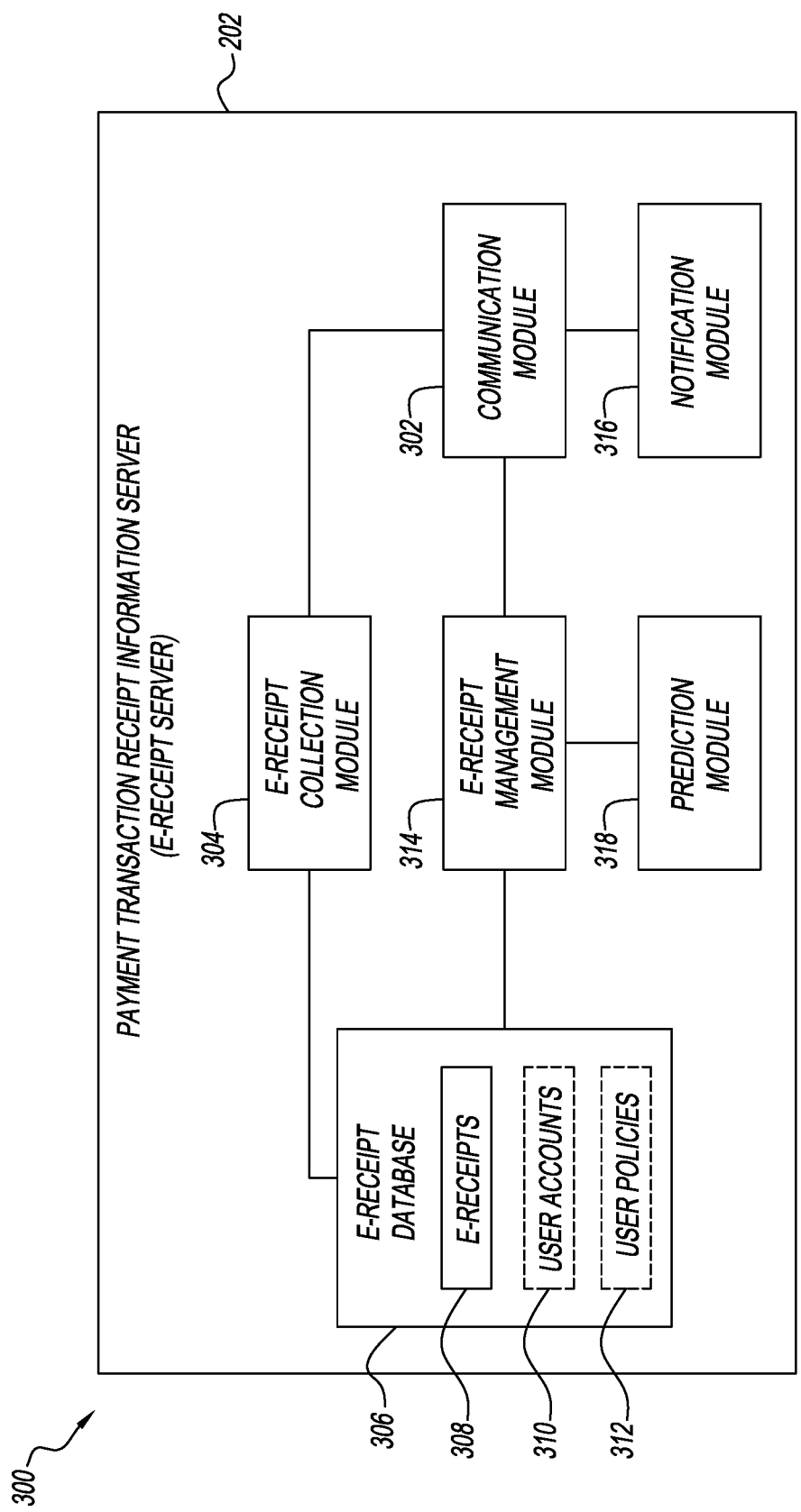
FIG. 3 is a simplified block diagram of at least one embodiment of a software environment of the electronic receipt server of FIG. 2 in accordance the present disclosure.

Referring now to FIG. 3, one embodiment of a software environment 300 of the e-receipt server 202 includes a communication module 302, an electronic receipt collection module 304, an electronic receipt database 306, an electronic receipt management module 314, and a notification module 316. Each of the modules 302, 304, 314, 316 can be embodied as software/firmware and associated hardware (e.g., logical units). Of course, it should be appreciated that the e-receipt server 202 can include other components, sub-components, modules, and devices commonly found in a server and/or computing device, which are not illustrated in FIG. 3 for clarity of the description.

As discussed above, the e-receipt server 202 is configured to store and manage one or more electronic receipts corresponding to one or more transactions. Transactions can include a purchase transaction (i.e., the purchase of goods or services), a return transaction (i.e., the return or cancellation of goods or services), a prescription refill transaction (i.e., the refill of an prescription), and any other type of transaction that can be documented for historical preservation and/or record keeping. As discussed above, each electronic receipt can correspond to a different transaction and can include electronic information describing one or more aspects or details of the transaction. For example, in some embodiments, an electronic receipt can include electronic information corresponding to the date that a product or service was purchased, the description of the product or service purchased, the price of the product or service, the name of the merchant, the location from which the product or service was purchased, the technical specifications of the product or service, the warranty information associated with the product or service, the return policy of the merchant, and any other information describing the details of a transaction. Additionally, the electronic receipt can include other forms of content associated with a particular transaction or product. For example, in some embodiments, the electronic receipt can include an image of the products or services purchased, recall information associated with the products or services purchased, an electronic version (i.e., a Portable Document Format (PDF) file, an e-book, a web page, and the like) of a user's manual, audio files, video files, and any other form of content describing an aspect of the product or service or the transaction itself.

In use, the communication module 302 facilitates communications with one or more of the POS terminal 222, the mobile computing device 242, and the computing device 262. In some embodiments, the communication module 302 receives one or more electronic receipts from the POS terminal 222 over the network 280. The communication module 302 can also receive one or more electronic receipts from the POS terminal 222 using the mobile computing device 242 as a proxy device. To do so, the communication module 302 can communicate with the mobile computing device 242 over the network 280 and receive an electronic receipt that was first transferred to the mobile computing device 242 from the POS terminal 222 via on or more NFC data exchanges 290 or other form of short-range communications.

The electronic receipt collection module 304 is communicatively coupled to the communication module 302 and facilitates storing a newly received electronic receipt corresponding to a transaction on the e-receipt server 202. In some embodiments, the electronic receipt collection module 304 parses the one or more electronic receipts and stores the parsed information in one or more tables of the electronic receipt database 306. To do so, the electronic receipt collection module 304 can parse an electronic receipt having a predefined or a reference format. For example, the electronic receipt in some embodiments may comprise an Extensible Markup Language (XML) document having one or more XML elements describing information associated with a transaction. In such embodiments, the electronic receipt collection module 304 can include an XML parser or some other mechanism for extracting information associated with the transaction from the XML document.

It should be understood that although the electronic receipt is described as being embodied as an XML document having XML elements in the illustrative embodiment, the electronic receipt can be embodied as a document or file having a different format in other embodiments. For example, the electronic receipt can be embodied as a comma-separated value (CSV) file, a text file, an encrypted data file, or any other format suitable to electronically embody information describing one or more aspects of a transaction. In other embodiments, the electronic receipt can also be embodied as an image file corresponding to a physical receipt generated during a transaction. In such embodiments, the image file can include metadata stored internally or externally to the image file. The metadata of the image file can contain the information associated with the transaction. In embodiments in which the electronic receipt is embodied as a document or file having a different format other than an XML document, the electronic receipt collection module 304 includes a suitable mechanism for parsing and storing the information from the electronic receipt in the electronic receipt database 306.

The electronic receipt database 306 can be stored in the data storage device 212 of the e-receipt server 202. The electronic receipt database 306 is configured to store one or more electronic receipts associated with one or more transactions. The electronic receipt database 306 can be embodied as or otherwise include one or more tables to store the electronic receipt information associated with each electronic receipt documenting a transaction. In the illustrative embodiment, the electronic receipt database 306 includes an electronic receipts table 308 to store the electronic receipt information associated with each electronic receipt. For example, the electronic receipt database 306 can store electronic receipt information associated with one or more transactions to purchase goods or services, return or cancel goods or services, refill prescriptions, and any other type of transaction that may be documented for historical preservation and/or record keeping. Additionally, in some embodiments, the electronic receipt database 306 can include a user accounts table 310 and/or a user policies table 312.

The user accounts table 310 of the electronic receipt database 306 can include information associated with each user of the e-receipt server 202. For example, the user accounts table 310 includes information (i.e., a user identifier) to identify each user. The user identifier can be any type of information that uniquely identifies a user. In some embodiments, the user identifier is embodied as a unique e-mail address assigned to the user. The unique e-mail address can be linked or otherwise associated with a personal e-mail address supplied by the user. In other embodiments, the user identifier can be embodied as a username either assigned to the user or chosen by the user during a registration process. In use, the user accounts table 310 can be used by the electronic receipt collection module 304 to identify a particular user and/or facilitate storing information parsed from a newly received electronic receipt in the electronic receipts table 308 as a function of the user identifier.

The user policies table 312 of the electronic receipt database 306 can include one or more policies defined by a user of the e-receipt server 202 to specify preferences or rules corresponding to the storage and management of electronic receipts. For example, the user policies table 312 can include rules specifying how newly received electronic receipts should be categorized on the e-receipt server 202, rules defining an alert or notification to be provided to the user if a certain event occurs or a threshold level is reached, rules defining other users that can access one or more electronic receipts corresponding to the user, and any other type of rule or preference suitable for managing and storing electronic receipts.

The electronic receipt management module 314 facilitates management of the e-receipt server 202 by the user. Additionally or alternatively, the electronic receipt management module 314 can facilitate viewing one or more of the electronic receipts stored in the electronic receipt database 306. To do so, the electronic receipt management module 314 can generate a user interface (UI) or otherwise provide remote management and/or viewing functionality. For example, the electronic receipt management module 314 can retrieve one or more receipts associated with the user from the electronic receipt database 306 as a function of the identifier assigned to the user. In some embodiments, the electronic receipt management module 314 generates one or more web pages, which when accessed by a web browser executing on the computing device 262 or the mobile computing device 242, enable the user to create and/or modify one or more settings or policies on the e-receipt server 202.

Additionally, the electronic receipt management module 314 can generate one or more web pages, which when accessed by the user, provide information associated with one or more electronic receipts formatted according to a user policy stored in user policies table 312. It should be understood that although the electronic receipt management module 314 generates one or web pages in the illustrative embodiment to provide remote management and/or viewing of electronic receipts stored on the e-receipt server 202, the electronic receipt management module 314 provides other mechanisms for remotely managing and/or viewing electronic receipts in other embodiments. For example, in some embodiments, the electronic receipt management module 314 facilitates communications with one or more applications executing on the mobile computing device 242 or the computing device 262. To do so, the electronic receipt management module 314 can perform one or more management functions in response to receiving commands generated by the one or more applications running on the mobile computing device 242 and/or the computing device 262.

The notification module 316 can generate one or more alerts and/or notifications to be provided to the user. In use, the notification module 316 can generate an alert and/or notification according to one or more of the user policies stored in the user policies table 312. For example, the user policies table 312 can include a policy defining a rule indicating the user should be alerted if a user-defined threshold setting a maximum amount of money that can be spent on a product or category of products has been reached during a specified time period. The notification module 316 can monitor the electronic receipts table 308 and determine whether the user-defined threshold set by the user in the policy has been reached. To do so, the notification module can aggregate one or more electronic receipts associated with the user to determine an aggregate amount of money spent for a given product or category of products.

In response to determining that the user-defined threshold has been reached, the notification module 316 can generate an alert and/or notification to be sent to the user using the communication module 302 via, for example, an e-mail message to the user, a Short Message Service (SMS) text to the mobile computing device 242 (i.e., a mobile phone, a smart phone, a tablet computer, etc.) of the user, and any other suitable mechanism for alerting and/or notifying the user. Additionally or alternatively, the notification module 316 can generate one or more alerts and/or notifications in response to determining that the communication module 302 has received a new electronic receipt and that the electronic receipt collection module 304 has stored the newly received electronic receipt in the electronic receipt database 306. Yet further, in some embodiments, the notification module 316 can generate reminders for particular due dates or services based on e-receipt information (e.g., the purchase date of product). For example, the notification module 316 can be configured to determine reminder data (e.g., "prescription refill due"), a reminder date based on the e-receipt information, and generate a reminder alert or notification of the reminder data on the reminder date. Such reminder alert can include for example, a notification for the refill of prescriptions, the renewal of insurance policies, the scheduling of routine home or auto maintenance, or any other service requiring periodic scheduling.

The prediction module 318 generates one or more predictive models based at least in part on the payment transaction receipt information and mined facts and/or conclusions. Predictive models can be selected based on the information obtained and stored in the one or more databases of the e-receipt server. The selection of information for representation in the predictive models can be different in every instance. In one embodiment, all information stored in each database can be used for selecting predictive models. In an alternative embodiment, only a portion of the information is used. The generation and selection of predictive models may be based on specific criteria.

As described herein, the predictive behavioral models are generated from the payment transaction receipt information obtained from the one or more databases, and optionally demographic and/or geographic information obtained from other databases. The information is analyzed, extracted and correlated by, for example, a financial transaction processing company (e.g., a payment card company) or a merchant, and can include financial account information, performing statistical analysis on financial account information, finding correlations between account information and consumer behaviors, predicting future consumer behaviors based on account information, relating information on a financial account with other financial accounts, or any other method of review suitable for the particular application of the data, which will be apparent to persons having skill in the relevant art.

Figure 4:
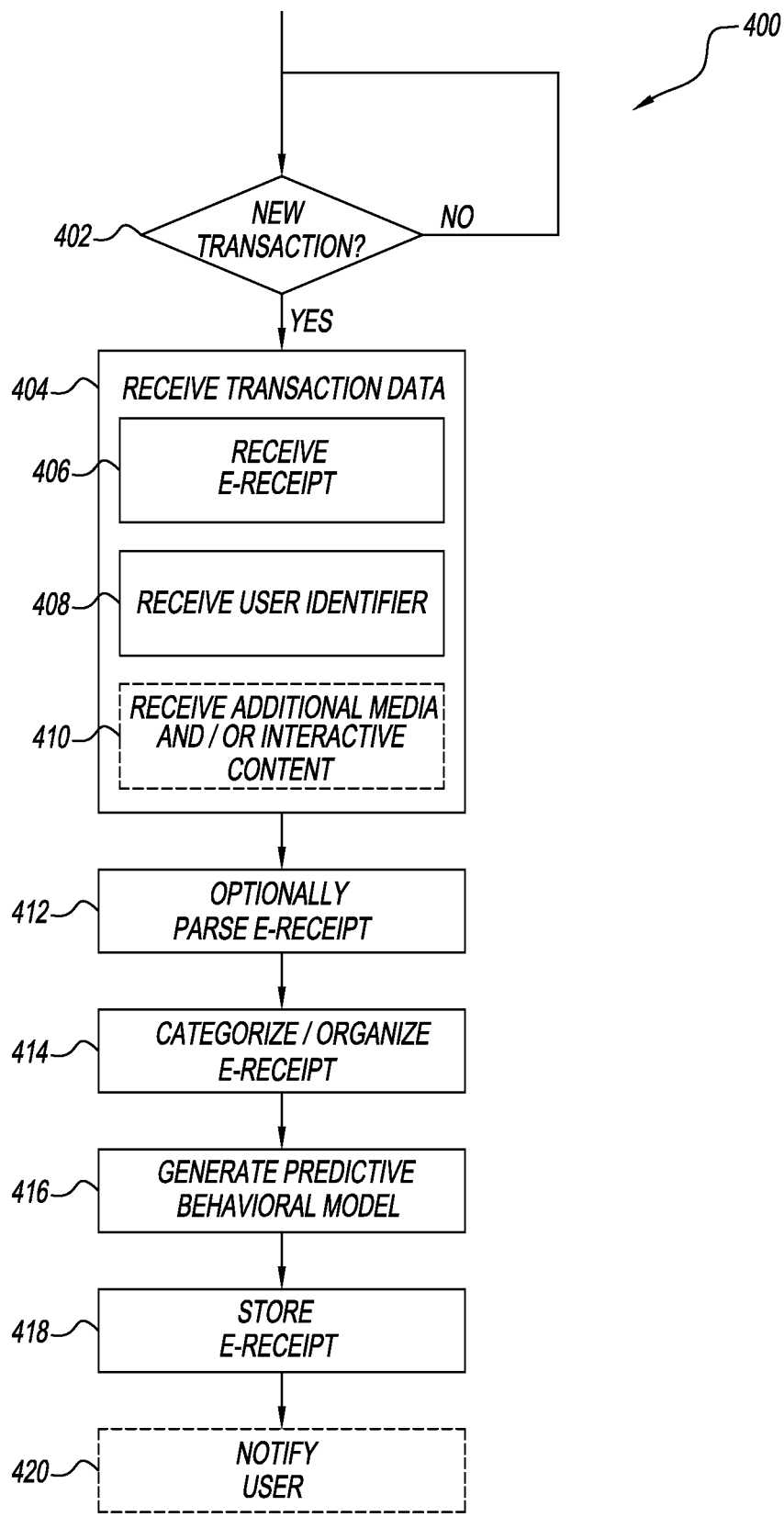
FIG. 4 is a simplified flow diagram of at least one embodiment of a method for receiving a new electronic receipt with the electronic receipt server of FIGS. 2 and 3 in accordance the present disclosure.

Referring now to FIG. 4, a method 400 for receiving a new electronic receipt with the e-receipt server 202 begins with block 402. In block 402, the e-receipt server 202 determines whether a new transaction has occurred. In some embodiments, the e-receipt server 202 can determine that a new transaction has occurred based on communications received from the POS terminal 222 or the mobile computing device 242, data entered into the POS terminal 222 or the mobile computing device 242 by a user, and/or the like. For example, the e-receipt server 202 can determine that the user has purchased a new product or service at the POS terminal 222. If the e-receipt server 202 determines that a new transaction has occurred, the method 400 advances to block 404.

In block 404, data corresponding to the new transaction is received by the e-receipt server 202. In some embodiments, the e-receipt server 202 receives the transaction data from the POS terminal 222 over the network 280. In other embodiments, the mobile computing device 242 is used as a proxy device between the POS terminal 222 and the e-receipt server 202. In such embodiments, the mobile computing device 242 first receives the transaction data from the POS terminal 222 using a contactless communication mechanism such as, for example, the NFC circuitry 254. Upon receipt, the mobile computing device 242 forwards (i.e., transmits) the transaction data to the e-receipt server 202 over the network 280. In some embodiments, the data and/or one or more of the communications between the e-receipt server 202, the POS terminal 222, and the mobile computing device 242 can be encrypted using one or more encryption keys stored in a secure storage on each device.

Alternatively, in some embodiments, the user can generate the e-receipt manually by entering data from a physical receipt of purchased product to an e-receipt template or specially-designed web interface, which can be accessed on the mobile computing device 242 and/or the computing device 262. In such embodiments, the manually-entered e-receipt can be marked or otherwise flagged as a self-generated e-receipt. The user can establish policy for in the user policies table 312 for the handling and/or labeling of such self-generated e-receipts. That is, such self-generated e-receipts can be handled in a manner different from the automated e-receipts for business or tax purposes and can be tracked accordingly.

The transaction data received by the e-receipt server 202 can be embodied as an electronic receipt including information associated with the transaction. As discussed above, a transaction can include a purchase transaction (i.e., the purchase of goods or services), a return transaction (i.e., the return or cancellation of goods or services), a prescription refill transaction (i.e., the refill of a prescription), and any other type of transaction that can be documented for historical preservation and/or record keeping. Additionally, the information associated with the transaction can describe one or more aspects or details of the transaction. For example, an electronic receipt can include information corresponding to the date that a product or service was purchased, the description of the product or service purchased, the price of the product or service, the name of the merchant, the location from which the product or service was purchased, the technical specifications of the product or service, the warranty information associated with the product or service, the return policy of the merchant, and any other information describing the details of the transaction.

In block 408, the e-receipt server 202 receives a user identifier from the POS terminal 222. In some embodiments, the electronic receipt also includes the user identifier, which as described above, identifies the particular user engaged in the transaction. For example, the electronic receipt can include the contact address and/or username assigned to the user. In use, the POS terminal 222 may obtain the e-mail address and/or username of the user during the transaction. The contact address and/or username of the user can be obtained via data entered into the POS terminal 222 (i.e., manual keyboard entry, voice recognition, optical recognition, entry on a touch screen device, biometric authentication, and the like). Regardless of the manner in which the contact address and/or username of the user is obtained, the POS terminal 222 can embed or otherwise include the unique contact address and/or username of the user in the transaction data, which is received by the e-receipt server 202 over the network 280.

In block 410, the electronic receipt, additionally or alternatively, can include additional forms of content associated with the transaction or the product purchased during the transaction. For example, the electronic receipt can also include an image of the products or services purchased, recall information associated with the products or services purchased, an electronic version (i.e., a Portable Document Format (PDF) file, an e-book, a web page, and the like) of a user's manual, audio files, video files, and any other form of content describing an additional aspect of the product or service or the transaction itself. Of course, the electronic receipt can also include interactive forms of content associated with the transaction and/or the product purchased during the transaction. For example, the electronic receipt can include an interactive troubleshooting guide, an interactive survey, and any other suitable form of interactive content for interacting with the user regarding the transaction or the product purchased during the transaction.

In use, the POS terminal 222 can embed or otherwise include the additional content in the transaction data, which is received by the e-receipt server 202. It should be appreciated that although the POS terminal 222 embeds or otherwise includes the additional content in the transaction data in the illustrative embodiment, the e-receipt server 202 can retrieve the additional content from a location identified by one or more links, pointers, file paths, and/or destination addresses embedded in the transaction data by the POS terminal 222 in other embodiments. For example, the e-receipt server 202 can use the links, pointers, file paths, and/or destination addresses embedded in the transaction data to access the additional content from an internal data storage device (i.e., the data storage device 212), an external storage device connected to a peripheral port (i.e., a Universal Serial Bus (USB) storage device), and/or one or more remote computing devices and/or storage devices over the network 280. Additionally, it should be appreciated that although the transaction data in the illustrative embodiment is described as separately including the electronic receipt, the user identifier, and the additional content, the transaction data can be embodied as the electronic receipt in other embodiments. In such embodiments, the electronic receipt can include the information associated with the transaction, the unique user identifier, and the additional content.

In block 412, upon receiving the transaction data from the POS terminal 222, the e-receipt server 202 parses the electronic receipt to obtain the information describing one or more aspects or details of the transaction or the purchased product. For example, as discussed above, the electronic receipt in some embodiments can comprise an Extensible Markup Language (XML) document having one or more XML elements describing the information associated with a transaction. In such embodiments, e-receipt server 202 can parse the electronic receipt using an XML parser to extract the information. Once the information describing the one or more aspects or details of the transaction have been extracted from the electronic receipt, the method 400 advances to block 414.

In block 414, the e-receipt server 202 categorizes and/or organizes the electronic receipt as a function of any number of predefined or reference categories. In some embodiments, the e-receipt server 202 categorizes and/or organizes the electronic receipt according to the type of transaction. For example, in embodiments in which the electronic receipt corresponds to a transaction for a monetary donation to a charity, the e-receipt server 202 can categorize the electronic receipt as a charitable contribution. In other embodiments, the e-receipt server 202 categorizes and/or organizes the electronic receipt according to one or more user policies stored in, for example, the user policies table 312 of the electronic receipt database 306. To do so, the e-receipt server 202 can retrieve a user policy defining one or more rules for categorizing and/or organizing electronic receipts. The e-receipt server 202 can then apply the retrieved user policy to categorize and/or organize the electronic receipt.

In block 416, one or more predictive models can be generated based at least in part on the payment transaction receipt information and mined facts and/or conclusions. Predictive models can be selected based on the information obtained and stored in the one or more databases of the e-receipt server. As described herein, the predictive behavioral models are generated from the payment transaction receipt information obtained from the one or more databases, and optionally demographic and/or geographic information obtained from other databases. The information is analyzed, extracted and correlated by, for example, a financial transaction processing company (e.g., a payment card company) or a merchant, and can include financial account information, performing statistical analysis on financial account information, finding correlations between account information and consumer behaviors, predicting future consumer behaviors based on account information, relating information on a financial account with other financial accounts, or any other method of review suitable for the particular application of the data, which will be apparent to persons having skill in the relevant art.

In block 418, the e-receipt server 202 stores the information extracted from the electronic receipt in the electronic receipt database 306. In use, the e-receipt server 202 can store the extracted information, for example, in the electronic receipts table 308 of the electronic receipt database 306 as a function of the user identifier and one or more user policies. For example, the e-receipt server 202 can store the information extracted from the electronic receipt in the electronic receipts table 308 such that the information is associated with the user identifier. To do so, the e-receipt server 202 can use the user identifier as a unique key while storing the extracted information from the electronic receipt in the electronic receipts table 308 of the electronic receipt database 306. In other embodiments, the e-receipt server 202 can retrieve a user policy defining one or more rules storing information associated with electronic receipts. In such embodiments, the e-receipt server 202 can store the extracted information according to the retrieved user policy. For example, in embodiments in which the extracted information from the electronic receipt includes the user's credit card number, the e-receipt server 202 can redact a portion of or otherwise prevent the credit card number from being stored in the electronic receipt database 306.

In block 420, the e-receipt server 202, additionally or alternatively, notifies the user that the electronic receipt corresponding to the transaction has been received and stored in the electronic receipt database 306. To do so, the e-receipt server 202 can generate an alert and/or notification to be sent to the user via, for example, an e-mail message addressed to the user's personal e-mail message, a Short Message Service (SMS) text to a mobile computing device 242 (i.e., a mobile phone, a smart phone, a tablet computer, and the like) of the user, and any other suitable mechanism for alerting and/or notifying the user. Additionally, as described above, the e-receipt server 202 can generate an alert and/or notification according to one of more of the user policies stored in the user policies table 312.

In an embodiment, this disclosure provides a method for generating and transmitting a new electronic receipt with the POS terminal. The POS terminal determines whether a new transaction has occurred. In some embodiments, the POS terminal is directly involved in a transaction with the user. For example, the user can purchase a product in which the POS terminal is used to complete the transaction. Additionally or alternatively, the POS terminal can be indirectly involved in the transaction with the user. For example, in embodiments in which the user purchases a product from an on-line retailer, the POS terminal can be used to complete the transaction based on information received from another computing system (i.e., an on-line sales device, a web server, and the like) operated by the on-line retailer.

If the POS terminal determines that a new transaction has occurred, the POS terminal receives the user identifier from the user involved in the transaction. As discussed above, the identifier of the user can include the contact address and/or username assigned to the user. To do so, the POS terminal can obtain the contact address and/or username of the user via data entered into the POS terminal (i.e., manual keyboard entry, voice recognition, optical recognition, entry on a touch screen device, biometric authentication, and the like).

Once the POS terminal receives the user identifier, the POS terminal generates the electronic receipt corresponding to the transaction. To do so, the POS terminal can collect information describing one or more aspects or details of the transaction or a product purchased during the transaction. For example, as described above, the information corresponding to the date that a product or service was purchased, the description of the product or service purchased, the price of the product or service, the name of the merchant, the location from which the product or service was purchased, the technical specifications of the product or service, the warranty information associated with the product or service, the return policy of the merchant, and any other information describing the details of the transaction can be collected by the POS terminal. Once the POS terminal has collected the information describing the one or more aspects or details of the transaction or the product purchased during the transaction, the POS terminal embeds or otherwise includes the information in the electronic receipt. To do so, the POS terminal can encode the information in a data file according to a predefined or reference format (i.e., an XML document, a CSV file, a text file, an encrypted data file, or any other format suitable to electronically embody information describing one or more aspects of a transaction).

The POS terminal can embed or otherwise include additional forms of content in the electronic receipt. As discussed above, the additional forms of content can be associated with the transaction or the product purchased during the transaction. It should be appreciated that although the POS terminal embeds or otherwise includes the additional content in the electronic receipt in the illustrative embodiment, the POS terminal in other embodiments, can embed or otherwise include one or more links, pointers, file paths, and/or destination addresses identifying a location from which the e-receipt server can retrieve the additional content.

The POS terminal can transmit the generated electronic receipt to the e-receipt server for storage and management. To do so, the POS device can transmit the electronic receipt to the e-receipt server over the network. In other embodiments, the mobile computing device can be used as a proxy device between the POS terminal and the e-receipt server. In such embodiments, the POS terminal can generate an NFC tag comprising the electronic receipt. To do so, the POS terminal may encode or otherwise convert the electronic receipt into the NFC tag. It should be understood that the NFC tag generated by the POS terminal can be embodied as either a physical NFC tag or a "soft" NFC tag on the POS terminal, either of which may be read by the NFC circuitry of the mobile computing device. Additionally, as discussed above, the user can manually generate an e-receipt in some embodiments based on data from a physical receipt.

In another embodiment, this disclosure provides a method for using the mobile computing device as a proxy between the POS terminal and the e-receipt server. The mobile computing device determines whether a new electronic receipt has been received. In some embodiments, the mobile computing device determines that a new electronic receipt has been received based on communications received from the POS terminal, data entered into the POS terminal by the user, and/or the like.

If so, the mobile computing device receives the electronic receipt from the POS terminal using one or more NFC data exchanges. For example, the NFC circuitry of the POS terminal can transmit the electronic receipt to the NFC circuitry of the mobile computing device upon completion of the transaction. Upon receiving the electronic receipt from the POS device using the one or more NFC data exchanges, the mobile computing device forwards (i.e., transmits) the electronic receipt to the e-receipt server over the network.

In another embodiment, this disclosure provides a method for managing one or more electronic receipts stored on the e-receipt server. The e-receipt server retrieves one or more electronic receipts associated with the user. To do so, the e-receipt server obtains the user identifier associated with the user. As discussed above, electronic receipts for a particular user are stored in the electronic receipt database such that each electronic receipt is associated with the user identifier assigned to that user. The e-receipt server can obtain the user identifier associated with the user from communications received from a web browser or one or more applications executing on the mobile computing device and/or the computing device, data entered into the mobile computing device and/or the computing device by the user by the user, and/or the like. Once obtained, the e-receipt server can use the user identifier to retrieve the electronic receipts associated with that particular user.

The e-receipt server can present the retrieved electronic receipts to the user. In some embodiments, the e-receipt server generates one or more web pages including the retrieved electronic receipts. The one or more web pages can be transmitted to a web browser executing on the mobile computing device and/or the computing device to be displayed to the user. Additionally or alternatively, in some embodiments, the mobile computing device and/or the computing device can include one or more applications (i.e., proprietary applications, mobile applications, open source applications, and the like) for viewing and/or managing electronic receipts. In such embodiments, the e-receipt server can transmit the retrieved electronic receipts to the mobile computing device and/or the computing device in a format suitable to be displayed by the one or more applications when executed.

The e-receipt server can determine that the user desires to manage one or more electronic receipts stored in the electronic receipt database. In some embodiments, the e-receipt server can determine that the user desires to manage one more of the electronic receipts based on communications received from the web browser and/or the one or more applications executing on the mobile computing device and/or the computing device.

If so, the e-receipt server can generate one or more web pages including management operations that the user may perform. The one or more web pages can be transmitted to the web browser executing on the mobile computing device and/or the computing device and displayed to the user. In use, the e-receipt server can receive commands and/or data indicative of one or more management operations desired to be performed by the user from the web browsers executing on the mobile computing device and/or the computing device. In embodiments wherein the mobile computing device and/or the computing device include one or more applications for managing electronic receipts, the e-receipt server can receive commands and/or data indicative of one or more management operations desired to be performed by the user from the applications. In response to receiving the commands and/or data indicative of a management operation desired to be performed by the user, the e-receipt server performs the corresponding management operations.

For example, the e-receipt server can receive a command requesting that one or more electronic receipts be re-categorized and/or re-organized; the e-receipt server can receive a command requesting that one or more alerts and/or notifications be generated or modified; and a command can be received indicative of the user's desire to define or redefine one or more user policies. Additionally, the e-receipt server can receive a request to generate one or more reports corresponding to one or more of the electronic receipts in some embodiments. For example, the e-receipt server can receive a command requesting that a report including all charitable contributions made during a predefined period of time and/or a user-defined period of time. It should be understood that although the management operations can be performed by e-receipt server in the illustrative embodiment, the e-receipt server is capable of receiving requests for and performing additional management operations. For example, the e-receipt server can receive one or more additional management operations corresponding to one or more electronic receipts (e.g., any suitable management operation to facilitate managing and storing electronic receipts).

In an embodiment, a provider of a system of this disclosure (e.g., a payment card company that is part of the payment card company network 150 in FIG. 1) can arrange with a plurality of entities to provide receipt management for the entities on a fee basis. For example, a payment card company can offer receipt management as a cloud service to which an entity (e.g., customer, payment card holder, merchant, and the like) can subscribe. An entity can then subscribe to this service, whereupon the provider would agree to provide the receipt management services. The provider can give the customer contact information (e.g., an e-mail address, an Instant Message (IM) address, a Uniform Resource Locator (URL), a phone number, an SMS identifier, an arbitrary string of characters that the e-receipt server associates with a particular customer but that is not decipherable by members of the general public such as spammers, and the like) that the customer can use to direct receipts to. This contact information, obtained by the customer from the provider, can be stored by the customer for later use. This contact information can serve as a form of customer identifier, which can be included in or otherwise associated with a receipt. The contact information can identify the customer in the sense that the customer may be associated with the particular contact information that is used to send receipts to the e-receipt server. However, other types of contact information can be included in a receipt.

After the e-receipt server has begun to receive receipts for a customer, various actions can be performed with respect to those receipts. For example, the customer can request to see the receipts, and the receipts can be presented to the customer. As another example, receipts contain various types of facts (e.g., what type of items the customer has purchased, how much money the customer has spent, and the like), and those facts, as well as conclusions from those facts, can be mined from the e-receipt server.

For example, if the customer made a recent purchase at a particular camera store for $100, this fact is a basic fact that can be mined from the customer's receipts. If the customer makes frequent purchases at camera stores, then a conclusion that might be mined is that the customer has an interest in photography. The foregoing are examples of facts and conclusions about a particular customer that can be mined from the customer's receipts. However, since a receipt store may store receipts for many different customers, facts and conclusions that span different customer's receipts (or even receipts that are anonymous, or for which the association between the customer and the receipt is not readily discernible) could also be mined. For example, if the receipts collected across all customers for a month show that purchases of a particular item are accelerating among purchasers in the 18-24-year-old range, then one could mine the conclusion that this particular item is becoming the next "fad". The subscription agreement between the provider and the customer might include authorization to have the customer's receipts analyzed, so that these kinds of facts and conclusions could be mined from customer receipts.

Another action that can be performed is to communicate, to the customer, data based on the receipt. The mined facts and/or conclusions are examples of data that could be based on a receipt. The receipts themselves are also examples of such data. For example, a provider can have some type of software that displays mined facts and/or conclusions in the form of a dashboard (or that otherwise presents or communicates these mined facts and/or conclusions to a person). The software might allow the provider to query for certain kinds of facts or conclusions (e.g., What is the most popular movie purchased in the last month by 18-24-year-olds in the Atlanta area? Or, what restaurant is most popular among employees of XYZ Corporation?).

A further action that can be performed is to make commercial offers based on the mined facts and/or conclusions. For example, if a customer has purchased an item at a particular store, then the customer can be sent a coupon or discount for that store as a loyalty incentive. Or, if the customer's purchases reflect an interest in skiing, then a coupon could be sent to the customer for a ski shop that would like to do business with the customer. This can be attractive for merchants that subscribe to access the information stored in the e-receipt server.

In accordance with the method of this disclosure, one or more predictive models can be generated based at least in part on the payment transaction receipt information and the mined facts and/or conclusions. Predictive models can be selected based on the information obtained and stored in the one or more databases of the e-receipt server. The selection of information for representation in the predictive models can be different in every instance. In one embodiment, all information stored in each database can be used for selecting predictive models. In an alternative embodiment, only a portion of the information is used. The generation and selection of predictive models can be based on specific criteria.

In a preferred embodiment of this disclosure, predictive models can be generated based on payment transaction receipt information across a plurality of merchants. This cross merchant approach can allow merchants to offer better and more targeted recommendations for customers which in turn can boost sales and customer satisfaction. In addition to getting an efficient solution to manage their receipts, customers can get the added benefit of an enhanced shopping experience.

Predictive behavioral models are generated from the payment transaction receipt information obtained from the one or more databases, and optionally demographic and/or geographic information obtained from other databases. The information is analyzed, extracted and correlated by, for example, a financial transaction processing company (e.g., a payment card company) or a merchant, and can include financial account information, performing statistical analysis on financial account information, finding correlations between account information and consumer behaviors, predicting future consumer behaviors based on account information, relating information on a financial account with other financial accounts, or any other method of review suitable for the particular application of the data, which will be apparent to persons having skill in the relevant art.

Activities and characteristics attributable to the consumers (e.g., payment card holders) based on the one or more predictive behavioral models are identified. The consumers have a propensity to carry out certain activities and to exhibit certain characteristics based on the one or more predictive behavioral models. The activities and characteristics attributable to the consumers and based on the one or more predictive behavioral models are conveyed, for example, by a financial transaction processing entity to a merchant. Alternatively, merchants may generate this information. This enables a targeted offer or other communication to be made by the merchant to the consumers. The transmittal can be performed by any suitable method as will be apparent to persons having skill in the relevant art.

In addition to the payment transaction receipt information, predictive behavioral models can optionally be defined based on geographical or demographical information obtained from other databases, including but not limited to, age, gender, income, marital status, postal code, income, spending propensity, and familial status. In some embodiments, predictive behavioral models can be defined by a plurality of geographical and/or demographical categories. For example, a predictive behavioral model can be defined for any card holder with an income between $50,000 and $74,999, which card holder is between the ages of 20 and 29, and is single.

Predictive behavioral models can also be based on behavioral variables. The payment transaction receipt information can be used to determine an individual's likeliness to spend. An individual's likeliness to spend can be represented generally, or with respect to a particular industry (e.g., electronics), retailer (e.g., Macy's®), brand (e.g., Apple®), or any other criteria that can be suitable as will be apparent to persons having skill in the relevant art. An individual's behavior can also be based on additional factors, including but not limited to, time, location, and season. For example, a predictive behavioral model can be based on consumers who are likely to spend on electronics during the holiday season, or on consumers whose primary expenses are in a suburb, but are likely to spend on restaurants located in a major city. The factors and behaviors identified can vary widely and can be based on the application of the payment transaction receipt information.

Behavioral variables can also be applied to generated predictive behavioral models based on the attributes of the entities. For example, a predictive behavioral model of specific geographical and demographical attributes (e.g., single males in a particular postal code between the ages of 26-30 with an income between $100,000 and $149,999) can be analyzed for spending behaviors. Results of the analysis can be assigned to the predictive behavioral models. For example, the above predictive behavioral model is analyzed and reveals that the entities in the predictive behavioral model have a high spending propensity for electronics and are less likely to spend money during the month of February.

In an embodiment, the payment transaction receipt information retrieved from the one or more databases can be analyzed to determine behavioral information of consumers. Also, information related to an intent of consumers can be extracted from the behavioral information. The predictive behavioral models can be based upon the behavioral information of the consumers and the intent of the consumers. The predictive behavioral models can be capable of predicting behavior and intent in the consumers.

Predictive behavioral models can be developed, for example, to examine spend behaviors and create spend associations. A spend association can be a set of spend behaviors that predict another spend behavior. For example, people that tend to purchase jewelry display the following spend behaviors: spend at Macy's®, travel on cruise ships, go to the movie theaters once a month, and so forth.

Figure 5:
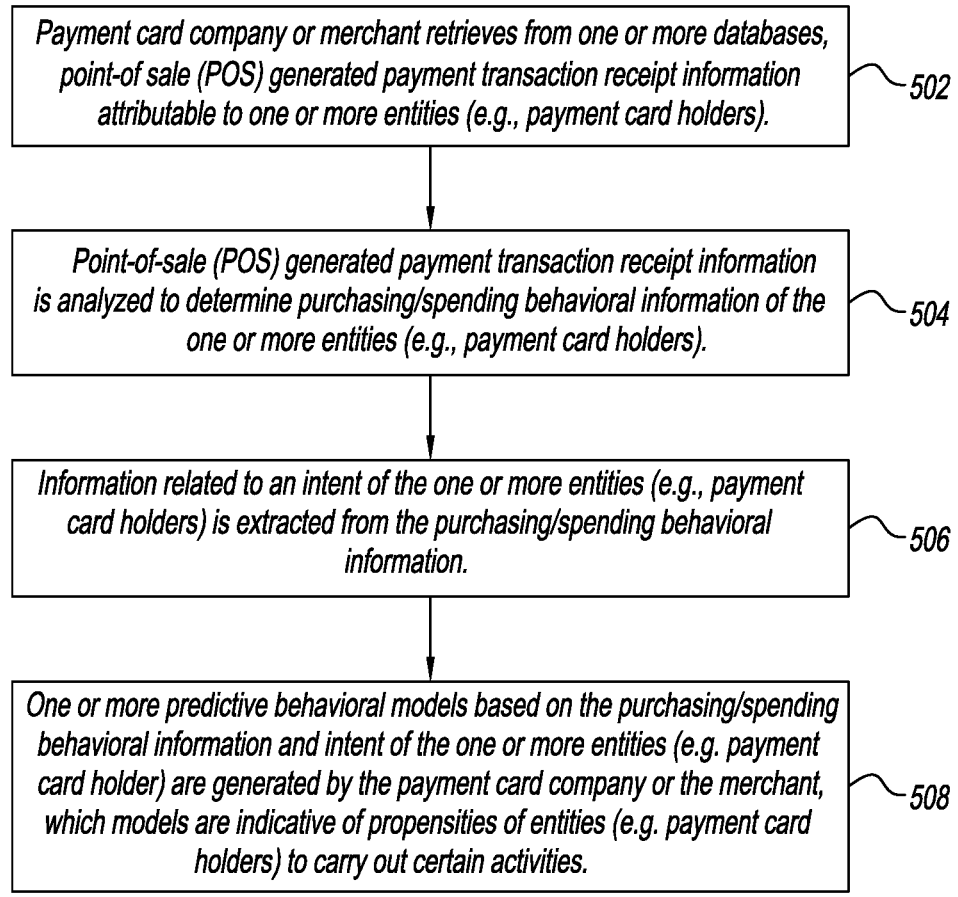
FIG. 5 is a flow chart illustrating a method for generating predictive behavioral models in accordance with exemplary embodiments of this disclosure.

A method for generating one or more predictive behavioral models is an embodiment of this disclosure. Referring to FIG. 5, the method involves a payment card company (part of the payment card company network 150 in FIG. 1) or merchant retrieving, from one or more databases, POS generated payment transaction receipt information attributable to one or more entities (e.g., payment card holders) as described herein. The information 502 comprises POS generated payment transaction receipt information, and optionally demographic and/or geographic information. The POS generated payment transaction receipt information is analyzed 504 to determine purchasing/spending behavioral information of the one or more entities (e.g., payment card holders). Information related to an intent 506 of the one or more entities (e.g., payment card holders) is extracted from the purchasing/spending behavioral information. One or more predictive behavioral models are generated 508 based on the purchasing/spending behavioral information and intent of the one or more entities (e.g., payment card holders) by the payment card company or the merchant. The one or more entities (e.g., payment card holders) have a propensity to carry out certain activities based on the one or more predictive behavioral models.

In analyzing payment transaction receipt information to determine behavioral information, intent and other payment card member attributes are considered. Developing intent of consumers involves models that predict specific spend behavior in the future and desirable spend behaviors. Examples include as follows: likely to purchase at Macy's® in the next 2 weeks; likely to spend at least $100 in consumer electronics in the next 30 days; likely to purchase a car in the next 60 days; likely to be interested in golfing; likely to be up for a cell phone renewal in the next 60 days; likely to be a business traveler; and the like.

Predictive behavioral models can equate to purchase behaviors. There can be different degrees of predictive behavioral models with the ultimate behavior being a purchase. An example using Macy's® is as follows: an extreme behavior is a consumer purchasing something once a week at Macy's® and spending five times what the average customer spends; a medium behavior is a consumer purchasing something at Macy's® once a month and spending twice what the average customer spends; and a low behavior is a consumer purchasing something at Macy's® once a year and spending what the average customer spends.

There is the potential for numerous predictive behavioral models including, for example, industries (e.g., consumer electronics, QSR), categories (e.g., online spend, cross border), geography spend (e.g., spend in New York City, spend in London), geography residence (e.g., live in New York City, live in Seattle), day/time spend (e.g., weekday spend, lunch time spend), calendar spend (e.g., spend a lot around Christmas, spend a lot on flowers before Valentine's Day), top number of merchants, and the like.

Other card holder attributes, in addition to the payment transaction receipt information, useful in generating the predictive behavioral models include, for example, geography (e.g., zip code, state or country), and demographics (e.g., age, gender, and the like).

In an embodiment, the method further comprises a payment card company conveying to a merchant the activities and characteristics attributable to the one or more payment card holders based on the one or more predictive behavioral models, to enable the merchant to make a targeted offer to the one or more payment card holders. The one or more predictive behavioral models are capable of predicting behavior and intent in the one or more payment card holders. The one or more payment card holders are people and/or businesses, the activities attributable to the one or more payment card holders are financial transactions associated with the one or more payment card holders, and the characteristics attributable to the one or more payment card holders are demographics and/or geographical characteristics of the one or more payment card holders.

A behavioral propensity score can be used for conveying to the merchant the activities and characteristics attributable to the one or more payment card holders based on the one or more predictive behavioral models. The behavioral propensity score is indicative of a propensity to exhibit a certain behavior.

Consumers (e.g., payment card holders) can represent a wide variety of categories and attributes. In one embodiment, consumers can be created based on spending propensity of spending index in a particular industry. Industries can include, as will be apparent to persons having skill in the relevant art, restaurants (e.g., fine dining, family restaurants, fast food), apparel (e.g., women's apparel, men's apparel, family apparel), entertainment (e.g., movies, professional sports, concerts, amusement parks), accommodations (e.g., luxury hotels, motels, casinos), retail (e.g., department stores, discount stores, hardware stores, sporting goods stores), automotive (e.g., new car sales, used car sales, automotive stores, repair shops), travel (e.g., domestic, international, cruises), and the like. Each industry can include a plurality of consumers (e.g., based on location, income groups, and the like).

Consumers can also be based on predictions of future behavior. For instance, a financial transaction processing company can analyze financial account information (e.g., payment transaction receipt information) and behavioral information to predict future behavior of a consumer.

A financial transaction processing company can analyze the generated predictive behavioral models (e.g., by analyzing the stored data for each entity comprising the predictive behavioral model) for behavioral information (e.g., spend behaviors and propensities). In some embodiments, the behavioral information can be represented by a behavioral propensity score. Behavioral information can be assigned to each corresponding predictive behavioral model.

Predictive behavioral models or behavioral information can be updated or refreshed at a specified time (e.g., on a regular basis or upon request of a party). Updating predictive behavioral models can include updating the entities included in each predictive behavioral model with updated payment transaction receipt information, and optionally demographic data and/or updated geographic data. Predictive behavioral models can also be updated by changing the attributes that define each predictive behavioral model, and generating a different set of behaviors. The process for updating behavioral information can depend on the circumstances regarding the need for the information itself.

Although the above methods and processes are disclosed primarily with reference to purchasing/spending behaviors, it will be apparent to persons having skill in the relevant art that the predictive behavioral models can be beneficial in a variety of other applications. Predictive behavioral models can be useful in the evaluation of consumer data that may need to be protected.

For instance, predictive behavioral models can have useful applications in measuring the effectiveness of advertising or other consumer campaigns. A party can desire to discover the effectiveness of a particular advertising campaign in reaching a specific set of consumers.

For example, a consumer electronics store may want to know the effectiveness of an advertising campaign initiated by the store and directed towards male consumers of a specific age and income group. The store can provide the financial transaction processing company with the demographic (e.g., demographical and geographical) data corresponding to the market. The financial transaction processing company can identify predictive behavioral models and summarize relevant spend behaviors for the identified predictive behavioral models. Summary of the relevant spend behaviors (e.g., showing an increase or decrease in spending at the consumer electronic store) for each predictive behavioral model (e.g., including the predictive behavioral models of ideal consumers) can be provided to the consumer electronics store.

Predictive behavioral model data can also be combined or matched with other sources of data. For example, other transaction processing agencies, advertising firms, advertising networks, publishers, etc. can provide information on consumer groupings of their own. The financial transaction processing company can link or match the received consumer groupings, such as by matching groupings to generated predictive behavioral models based on geographical or demographical data.

Systems and methods disclosed herein can also have applications to the mobile communication device industry. For example, it may be common practice that mobile communication carriers provide mobile communication devices and services to consumers on a renewable contract for a specified time period (e.g., two years). The financial transaction processing company can be able to analyze spending behaviors for financial accounts to generate a predictive behavioral model or audience of individuals who may be nearing a renewal term on a contract with a mobile communication carrier (e.g., by identifying when a mobile communication device was purchased or two years of recurring payments to a mobile communication carrier). The audience can be provided to a mobile carrier as an ideal consumer base representing consumers in a position to change mobile communication carriers or take advantage of new contract offers. As another example, business travelers can be identified as a result of spending behaviors (e.g., weekday spending, a plurality of hotel, restaurant, and airline transactions, and the like) for generation of a corresponding audience of behaviors. Other beneficial applications of the systems and methods disclosed herein will be apparent to persons having skill in the relevant art(s).

One example of a predictive behavioral model is as follows: live in the following zip codes AND like GAP® AND like Nordstrom® AND like movies AND like consumer electronics, etc. In 712, another example of a predictive behavioral model is as follows: between the ages of 25-35 AND like woman's apparel AND like Bloomingdales® AND like jewelry AND like family restaurants, and the like.

The predictive behavioral models are used to predict behavior and intent in consumers (e.g., the above predictive behavioral model examples are used to predict individuals likely to purchase at Macy's® in the next week). The merchant can execute promotions to targeted potential purchasers through their mobile channel, e-mail or other mail options.

One or more algorithms can be employed to determine formulaic descriptions of the assembly of the payment transaction receipt information and optionally demographic and/or geographic information, using any of a variety of known mathematical techniques. These formulas in turn can be used to derive or generate one or more predictive behavioral models using any of a variety of available trend analysis algorithms.

It will be understood that the present disclosure can be embodied in a computer readable non-transitory storage medium storing instructions of a computer program that when executed by a computer system results in performance of steps of the system or method described herein. Such storage media can include any of those mentioned in the description above.

In particular, there is provided a computer readable non-transitory storage medium storing instructions of a computer program, which when executed by a computer system, results in performance of steps of: storing in an electronic storage device a database of payment transaction receipt information; accessing the database; and providing information concerning the payment transaction receipt information to an entity that has been granted access to the database.

Where methods described above indicate certain events occurring in certain orders, the ordering of certain events can be modified. Moreover, while a process depicted as a flowchart, block diagram, or the like can describe the operations of the system in a sequential manner, it should be understood that many of the system's operations can occur concurrently or in a different order.

The terms "comprises" or "comprising" are to be interpreted as specifying the presence of the stated features, integers, steps or components, but not precluding the presence of one or more other features, integers, steps or components or groups thereof.

Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it can be based on one or more other things as well. In other words, unless expressly indicated otherwise, as used herein "based on" means "based at least in part on" or "based at least partially on."

It should be understood that the present disclosure includes various alternatives, combinations and modifications could be devised by those skilled in the art. For example, steps associated with the processes described herein can be performed in any order, unless otherwise specified or dictated by the steps themselves. The present disclosure is intended to embrace all such alternatives, modifications and variances that fall within the scope of the appended claims.

What is claimed is:

1. A method comprising:
receiving, by an electronic receipt server, point-of-sale (POS) generated payment transaction receipt information over a network, the POS generated payment transaction receipt information corresponding to a product or a service purchased during a purchase transaction;
parsing, by the electronic receipt server, the POS generated payment transaction receipt information to retrieve information describing an aspect of the purchased product or service, or the purchase transaction; and
storing, by the electronic receipt server, the POS generated payment transaction receipt information, and the information retrieved describing an aspect of the purchased product or service or the purchase transaction, as an electronic receipt in a database;
wherein the database comprises a plurality of electronic receipts, and each of the plurality of electronic receipts is associated with an identifier of a user;
wherein the POS generated payment transaction receipt information is generated from a POS component that performs the purchase transaction at a location at which a customer and the POS component are physically present together and causes the POS generated payment transaction receipt information to be sent to a customer contact address identified on a payment card that is used in the purchase transaction, and wherein POS generated payment transaction receipt information that is selected by the customer is sent over a network for storage in the one or more databases;
wherein the payment card comprises an information storage medium having stored encoded data, and at least part of the stored encoded data comprises the customer contact address;
wherein the electronic receipt server warehouses the plurality of electronic receipts in a structured format to allow the customer to link all transaction accounts of the customer and query, in multiple ways, the transaction accounts;
wherein the electronic receipt server comprises (1) a communication module that facilitates communications with one or more of the POS component and a computing device, (2) a notification module that generates one or more alerts and/or notifications to the one or more entities, and (3) a prediction module that generates one or more predictive behavioral models based on the POS generated payment transaction receipt information and intent of one or more entities; and
wherein the one or more predicative behavioral models (a) are indicative of a propensity of the one or more entities and (b) predict behavior and intent of the one or more entities.

2. The method of claim 1, further comprising:
receiving, by the electronic receipt server, a command from a remote computing device requesting a management operation be performed on the electronic receipt; and
performing, by the electronic receipt server, the requested management operation.

3. The method of claim 1, wherein the POS generated payment transaction receipt information is stored by one or more of: date that a product or service was purchased, description of the product or service purchased, price of the product or service, name of a merchant, location from which the product or service was purchased, technical specifications of the product or service, warranty information associated with the product or service, and return policy of the merchant.

4. The method of claim 1, wherein the customer contact address comprises an e-mail address or a mobile communication device number.

5. A machine readable media comprising a plurality of instructions, which in response to being executed, result in an electronic receipt server:
- receiving point-of-sale (POS) generated payment transaction receipt information over a network, the POS generated payment transaction receipt information corresponding to a product or a service purchased during a purchase transaction;
- parsing the POS generated payment transaction receipt information to retrieve information describing an aspect of the purchased product, service or the purchase transaction; and
- storing the POS generated payment transaction receipt information, and the information retrieved describing an aspect of the purchased product, service or the purchase transaction, as an electronic receipt in one or more databases;
- wherein the one or more databases comprise a plurality of electronic receipts, and each of the plurality of electronic receipts is associated with an identifier of an entity;
- wherein the POS generated payment transaction receipt information is generated from a POS component that performs the purchase transaction at a location at which a customer and the POS component are physically present together, and that causes the POS generated payment transaction receipt information to be sent to a customer contact address identified on a payment card that is used in the purchase transaction, and wherein the POS generated payment transaction receipt information that is selected by the customer is sent over a network for storage in the one or more databases;
- wherein the payment card comprises an information storage medium having-stored encoded data, and at least part of the stored encoded data comprises the customer contact address;
- wherein the electronic receipt server warehouses the plurality of electric receipts in a structured format to allow the customer to link all transaction accounts of the customer and query, in multiple ways, the transaction accounts;
- wherein the electronic receipt server comprises (1) a communication module that facilitates communications with one or more of the POS component and a computing device, (2) a notification module that generates one or more alerts and/or notifications to the one or more entities, and (3) a prediction module that generates one or more predictive behavioral models based on the POS generated payment transaction receipt information and intent of one or more entities; and
- wherein the one or more predicative behavioral models (a) are indicative of a propensity of the one or more entities and (b) predict behavior and intent of the one or more entities.

6. The machine readable media of claim 5, wherein the plurality of instructions further result in the electronic receipt server either:
- retrieving the electronic receipt from the one or more databases as a function of the identifier of the entity, or
- receiving a command from a remote computing device requesting a management operation be performed on the electronic receipt; and
- performing the requested management operation.

7. The machine readable media of claim 5, wherein the customer contact address comprises an e-mail address or a mobile communication device number.

* * * * *